United States Patent [19]
Fraser

[11] Patent Number: 6,067,416
[45] Date of Patent: May 23, 2000

[54] METHOD FOR DYNAMICALLY WRAPPING FILES FOR DOWNLOADING

[76] Inventor: Robert E. Fraser, 10575 Bradshaw St., Overland Park, Kans. 66215

[21] Appl. No.: 08/868,052

[22] Filed: Jun. 3, 1997

[51] Int. Cl.[7] ........................................ G06F 9/44
[52] U.S. Cl. .................. 395/712; 705/26; 380/4
[58] Field of Search .................... 395/200, 712; 707/2, 3; 713/187, 191; 705/26; 380/4; 709/216–223

[56] References Cited

U.S. PATENT DOCUMENTS

| | | | |
|---|---|---|---|
| 4,916,637 | 4/1990 | Allen et al. | 364/513 |
| 5,570,291 | 10/1996 | Dudle et al. | 364/468.01 |
| 5,794,230 | 8/1998 | Horadan et al. | 707/2 |
| 5,796,952 | 8/1998 | Davis et al. | 395/200.54 |
| 5,835,735 | 11/1998 | Mason et al. | 395/287 |
| 5,848,291 | 12/1998 | Milne et al. | 395/701 |
| 5,887,060 | 3/1999 | Ronning | 380/4 |
| 5,892,904 | 4/1999 | Atkinson et al. | 713/201 |
| 5,894,516 | 4/1999 | Bradenburg | 380/4 |
| 5,903,647 | 5/1999 | Ronning | 380/4 |
| 5,905,860 | 5/1999 | Olsen et al. | 380/4 |
| 5,907,617 | 5/1999 | Ronning | 380/4 |
| 5,933,497 | 9/1999 | Beetcher et al. | 380/4 |

OTHER PUBLICATIONS

"Portland Software and CyberSource join forces to deliver Bags of Bits", PR Newswire, Oct. 1997.

"Andover Ships SOFTWrappper, an Electric Commerce Soiftware Shell for Product Evaluation, Sale and Distribution via the Internet", PR Newswire, Jan. 1997.

"Xerox Selects Release Software for Electronic Software Distribution of its Software Products" PR Newswire, May 1997.

Release Software Third–Generation Electronic Software Distribution Tool Designed to Generate Demand for Software Sales, PR Newswire, Mar. 1997.

"The Buzz about Electronic Software Distribution", PC Week, Apr. 1997, pp 79.

Studt, "Downloading Software from Web Sites", REsearch and Development, Nov. 1996.

"Software Stores Up and Running" InformationWeek, Jun. 1996, pp 83.

"Microsoft Prepares for Electronic Distribution", Computer Retail Week, May 1996, pp 8.

*Primary Examiner*—Tariq R. Hafiz
*Assistant Examiner*—Kakali Chaki
*Attorney, Agent, or Firm*—Hovey, Williams, Timmons & Collins

[57] ABSTRACT

A file wrapping and downloading method for downloading files from a server computer (12) to a user computer (14) over a communications network (16) such as the Internet is disclosed. The method dynamically embeds or wraps relevant store/reseller information into a file while the file is being downloaded, thus eliminating the need for a special wrap for each store or reseller. The method is preferably partially implemented by a Dynamic Wrapping Engine (DWE) program residing on web server computer (12).

19 Claims, 1 Drawing Sheet

METHOD FOR DYNAMICALLY WRAPPING FILES FOR DOWNLOADING

SOURCE CODE APPENDIX

An appendix containing the source code of a computer program that implements a portion of the method of the present invention is appended hereto.

BACKGROUND OF THE INVENTION

1. Field of the Invention

The present invention relates to a method for downloading files such as software products from a server computer to a user computer over a communications network such as the Internet. More particularly, the invention relates to such a method that dynamically wraps or embeds information into the files while the files are being downloaded.

2. Description of the Prior Art

The explosive growth of the Internet combined with the ever-increasing number of software products such as computer programs and computer games available for sale has dramatically increased the number of files that are downloaded over the Internet. Electronic software distribution (ESD) and other web commerce systems on the Internet now allow users to access a web server that hosts a software store or reseller, request a software product, and then receive a downloaded copy of the software product from the server.

Before a software product can be downloaded, however, the server administrator must collect all of the files for the product, combine the files into a single file, and then encrypts or wraps the file for security purposes, resulting in an encrypted "bag-of-bits" (BOB). A consumer wishing to purchase the software product then downloads the BOB, pays for it, and decrypts it at the consumer's user computer.

Unfortunately, these prior art file-wrapping processes lack scaleability. Typical ESD system administrators operate many different software stores or resellers on the same server that can each be accessed by users to download software products. Prior art wrapping techniques require that each software product be separately wrapped for each store to include store-identifying information needed to track from which store the software product was ordered for accounting purposes. If an ESD system includes 10,000 separate stores, and each store sells 10,000 different software products, the ESD system must perform 10,000×10,000, or 100,000,000, wraps, and each of these wrapped files must be stored on the web server so they can be readily copied and downloaded when requested by a consumer. Furthermore, each time a vendor fixes a bug in a software product or otherwise changes the product, each store must rewrap the software products.

Those skilled in the art will appreciate that such a large number of wrapping processes cannot be performed in a timely or efficient manner. Moreover, the amount of server memory that would be required to store all of the wrapped software products for each store would be excessive. As the number of software products and ESD stores or resellers increases, these problems will worsen.

OBJECTS AND SUMMARY OF THE INVENTION

In view of the foregoing, it is an object of the present invention to provide an improved method for downloading files such as software products from the Internet.

It is a more particular object of the present invention to provide a file-wrapping method that is scaleable regardless of the number of software products and the number of stores or resellers selling the software products.

It is another object of the present invention to provide a file-wrapping method that eliminates the need to rewrap software products for each individual store or reseller operated by an ESD system.

The present invention achieves these objects and other objects that become evident from the description of the preferred embodiments of the invention herein by providing an improved file wrapping and downloading method for downloading files from a server computer to a user computer over the Internet. The present invention dynamically embeds or wraps relevant store/reseller information as well as other important information into a file during the downloading process, thus eliminating the need for a special wrap for each reseller. The method of the present invention is preferably implemented by a Dynamic Wrapping Engine (DWE) program on a web server computer.

More specifically, when a user wishes to download a software product or other file, the user first enters into the web browser program on the user's computer the URL of the site at which the file to be downloaded is located. The browser then connects to the corresponding web server and requests the file. The web server software responds by launching the DWE program on the web server. The DWE accesses the specified file and embeds special information into the file such as the user's name, the download date, and identifying information for the store from which the software product is downloaded. The DWE program then sends the file along with the embedded information to the web server software, which in turn sends it to the web browser on the user's computer one byte at a time. The browser assembles the file one byte at a time on the user's computer so that the user has a modified copy of the original file.

The present file wrapping and downloading method provides numerous important advantages. For example, by dynamically embedding reseller information into each software product during the downloading process, the need to manually wrap and store each individual software product for each reseller is completely eliminated. Thus, the method of the present invention provides a completely scaleable file wrapping and downloading method regardless of the number of stores/resellers and software products. Using the example of 10,000 software products and 10,000 stores described above, the dynamic wrapping of the present invention requires that each of the 10,000 software products be wrapped one time. Then, during the download process, each product is dynamically rewrapped with relevant seller information.

The dynamic wrapping method of the present invention also provides powerful referral tracking capability. Referring partner information can be embedded into a software product so that the ESD system can readily track and identify which referring partner generated a sale. Similarly, data identifying an ad or promotion that induced a sale of a software product can be embedded into the software product to permit the ESD system to more easily gauge the effectiveness of the ad or promotion.

BRIEF DESCRIPTION OF THE DRAWING FIGURES

A preferred embodiment of the present invention is described in detail below with reference to the attached drawing figures, wherein:

FIG. 1 is a block diagram of computer hardware that may be used to perform the steps of the present invention; and FIG. 2 is a flow diagram illustrating the steps of the method of the present invention as well as the operation of the computer program for implementing the method.

DETAILED DESCRIPTION OF THE PREFERRED EMBODIMENTS

Figure 1:
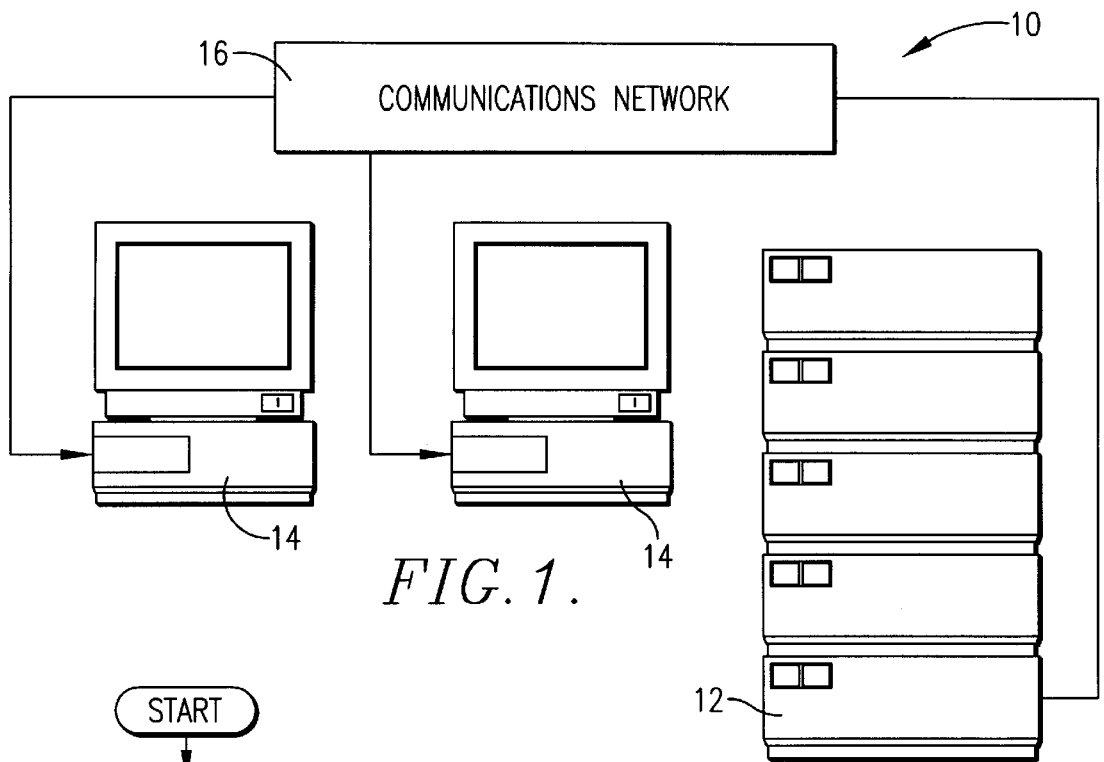

FIG. 1 illustrates a computer system 10 that may be used while performing the steps of the present invention. The system 10 preferably includes a server computer 12, a plurality of user computers 14, and a communications network 16 for providing communications between the server computer and the user computers. Those skilled in the art will appreciate that the method of the present invention may be implemented with virtually any type of computer hardware and that the hardware described herein is merely exemplary.

The server computer 12 is preferably a conventional microcomputer, minicomputer, or mainframe computer such as those manufactured by IBM, Sun, or Digital Equipment Corporation. The server computer includes memory, input and output ports, and a network connection and is operable for receiving, storing, retrieving, and transmitting data such as software products and other files. The server computer is programmed with conventional www server operating software as well as software for implementing some of the steps of the present invention as described in more detail below.

The user computers 14 are preferably personal computers such as IBM compatible microcomputers containing Intel Pentium or equivalent type microprocessors. Each user computer includes memory, input and output ports, and a network connection, and is operable for transmitting file requests as well as receiving and storing files. Each user computer is programmed with conventional operating software such as Microsoft Windows and a web browser program such as Netscape Navigator.

The communications network 16 is preferably a conventional telecommunications network including a plurality of switches and local exchange carriers that carry Internet traffic. The network 16 may also be a local area network, wide area network, wireless network, voice network, or any other type of conventional network capable of providing communication between the server computer and the user computers.

Figure 2:
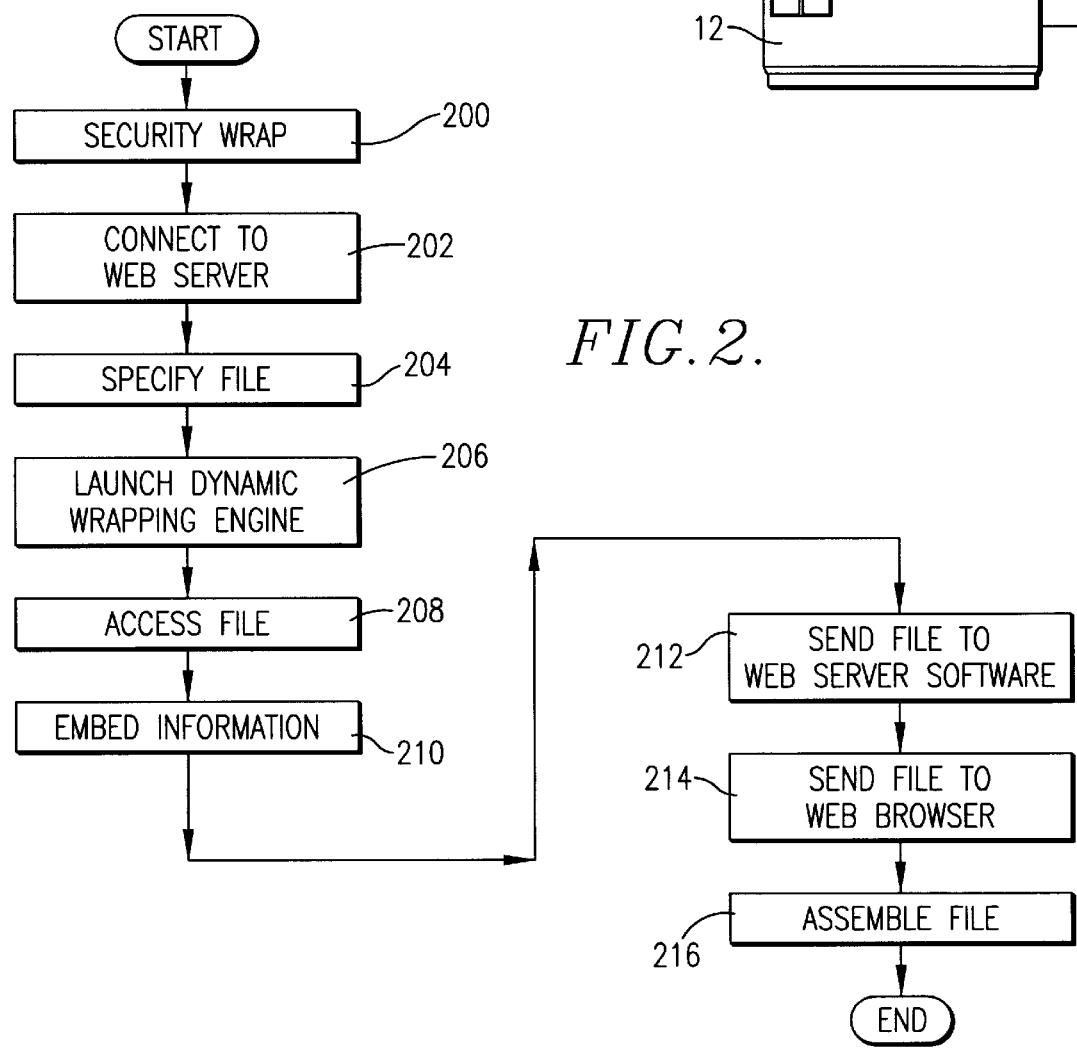

The preferred steps of the method of the present invention are illustrated in FIG. 2. Some of the steps of the method are preferably implemented with a Dynamic Wrapping Engine (DWE) program residing in the memory of the server computer 12 for controlling some of the operations of the server computer. The source code of the DWE program is reproduced in the attached Source Code Appendix, which is incorporated fully into the Specification of the present application.

The method of the present invention allows an electronic software distribution (ESD) system administrator to operate the server computer 12 to download software products or other files to users operating the user computers 14. The ESD administrator may operate numerous software stores or resellers that each sell software products on the same server computer.

The server administrator first collects all of the files for a software product to be sold into a single file and then encrypts or wraps the files for security purposes, resulting in an encrypted "bag-of-bits" (BOB) as depicted by step 200 of FIG. 2. This process is performed for each software product to be sold. The BOBs may also be compressed using conventional file compression techniques.

To download a software product from the server computer 12, a user operating one of the user computers 14 enters the URL of the store into the web browser program to connect to the server computer as depicted in step 202. The user then selects or specifies the file to be downloaded as depicted in step 204.

The web server software residing on the server computer 12 then launches the DWE program as depicted in step 206 preferably by using a standard web server interface such as the CGI standard. The DWE program accesses the specified file (step 208) and dynamically embeds special information into the file (step 210) during the downloading process. The embedded information may include any information that is known about the user or the store at the time the software product is downloaded. For example, the DWE program may embed into the file data representative of the user's name or a key assigned to the user so that only the user can unwrap the file once it is downloaded to the appropriate user computer 14. This prevents others from intercepting and using software products downloaded by the user without authorization.

The DWE program may also embed into the file data representative of the download date and time. This permits monitoring and enforcement of software expiration dates such as 30 day trial use periods for software products that are downloaded for free.

Additionally, the DWE program may embed into the file data representative of the store or referring partner from which the software product is ordered or downloaded. This allows the ESD administrator to track from which store or referring partner a software product was sold or referred. The ability to accurately track this information is crucial for accounting purposes and also permits the ESD administrator to offer rewards or promotions to stores or resellers based on the number of software products sold.

Similarly, the DWE program may embed into the file data representative of an ad or promotion which induced a sale of a software product. This allows the ESD administrator to gauge the effectiveness of the ad or promotion. Particularly, the administrator can divide the sales generated by an ad or promotion by the cost of the ad to determine the return-on-investment of the ad. Using this information, an administrator can determine which ads or promotions are cost-effective and can expand or fine-tune ads or promotions to increase sales.

By dynamically embedding the foregoing information into each software product during the downloading process, the method of the present invention eliminates the need to specially wrap each individual software product for each reseller and the need to store the specially wrapped files in the memory of the server computer 12. The DWE program preferably embeds the foregoing information into a software product by searching the file for markers and replacing the marks with the embedded information. For example, if the program locates a marker in a program set aside for the name of the user, the program replaces the marker with the name of the user downloading the file.

Returning to FIG. 2, the DWE program next sends the file along with the embedded information to the web server software as depicted in step 212. The web server software then sends the file to the web browser on the user's computer over the communications network 16 one byte at a time as illustrated in step 214. Finally, the browser assembles the file one byte at a time on the user's computer as depicted in step 216 so that the user has a modified copy of the original file.

Although the invention has been described with reference to the preferred embodiment illustrated in the attached drawing figures, it is noted that equivalents may be employed and substitutions made herein without departing from the scope of the invention as recited in the claims. For example, although the method of the present invention is preferably implemented with the aid of the DWE program set forth in the Appendix, the invention is not limited by the particular program but instead encompasses all equivalent means to carry out the method steps.

Having thus described the preferred embodiment of the invention, what is claimed as new and desired to be protected by Letters Patent includes the following:

SOURCE CODE APPENDIX for a

DYNAMIC WRAPPING ENGINE

-A1-

SOURCE CODE FOR A DYNAMIC WRAPPING ENGINE.

The first routine sends the unpacker to the browser, modifying
it enroute.

The second routine follows the unpacker with the "secure wrapped" file. The
resulting file, when assembled at the browser, is a modified
unpacker concatenated with a wrapped file.

```
__declspec(dllexport) int
utilAppendUnp(LPSTR lpszDstPath, LPSTR lpszUnpPath, LPUNP_CONFIG
lpCfg)
{
        FILE *fo = NULL;
        FILE *fi = NULL;
        void *lpBuf = NULL;
        int nResult = 0;

try {
                if ((fo = fopen(lpszDstPath, "ab")) == NULL) throw ferror(fo);
                if ((fi = fopen(lpszUnpPath, "rb")) == NULL) throw ferror(fi);

// seek to end of source to determine length
                if (fseek(fi, 0, SEEK_END) != 0) throw ferror(fi);
                long lLen = ftell(fi);
                if (fseek(fi, 0, SEEK_SET) != 0) throw ferror(fi);

// alloc buffer
                if ((lpBuf = malloc(lLen)) == NULL) throw -1;

// read file into buffer
                fread(lpBuf, 1, lLen, fi);

// search for config block
```

-A2-

```
        void *p = lpBuf;
        for (;;) {
                if ((p = memchr(p, 'X', lLen)) == NULL) throw -2;
                if (memcmp(p, "XXXXXXX", 7) == 0) {
                        break;
                }
                ((char *&)p)++;
        }

// end-of block
        if (memcmp(((LPUNP_CFGBLK)p)->szFooter, "ZZZZZZZ", 7) !=
0) throw -3;

// init config block
        UNP_CFGBLK b;
        memcpy(&b.Cfg, lpCfg, sizeof(UNP_CONFIG));
        if (b.Cfg.dtDownloaded == 0)
                time(&b.Cfg.dtDownloaded);       // set time // encrypt config block
        // NOTE: insert code here to encrypt config block // substitute in config block
        memcpy(p, &b, sizeof(UNP_CFGBLK));

// write to output
        fwrite(lpBuf, 1, lLen, fo);
    } catch (int nErr) {
        nResult = nErr;
    } if (lpBuf != NULL) free(lpBuf);
```

-A3-

```c
        if (fi != NULL) fclose(fi);
        if (fo != NULL) fclose(fo);

return nResult;
}

__declspec(dllexport) int
utilAppendFile(LPSTR lpszDstPath, LPSTR lpszFilePath)
{
        #define BUFSIZE 4096
        FILE *fo = NULL;
        FILE *fi = NULL;
        void *lpBuf = NULL;
        int nResult = 0;
        int nLen;

try {
                if ((fo = fopen(lpszDstPath, "ab")) == NULL) throw ferror(fo);
                if ((fi = fopen(lpszFilePath, "rb")) == NULL) throw ferror(fi);

// alloc buffer
                if ((lpBuf = malloc(BUFSIZE)) == NULL) throw -1;

// copy file
                for (;;) {

// read file into buffer
                        nLen = fread(lpBuf, 1, BUFSIZE, fi);
                        if (ferror(fi)) throw ferror(fi);

// write to output
                        fwrite(lpBuf, 1, nLen, fo);
                        if (ferror(fo)) throw ferror(fo);
```

-A4-

```
            if (feof(fi)) break;
        }
    } catch (int nErr) {
        nResult = nErr;
    } if (lpBuf != NULL) free(lpBuf);
    if (fi != NULL) fclose(fi);
    if (fo != NULL) fclose(fo);

return nResult;
}
```

What is claimed is:

1. A method of operating a server computer to download purchased software to a user computer over a network, the method comprising the steps of:
   receiving from the user computer a request for the purchased software;
   accessing the purchased software;
   dynamically embedding information into the purchased software after the purchased software has been requested by the user computer; and
   sending the purchased software along with the embedded information in portions to the user computer over the network so that the user computer can reassemble a modified version of the purchased software and the embedded information.

2. The method as set forth in claim 1, the embedding step including embedding into the purchased software data representative of a name of a user operating the user computer.

3. The method as set forth in claim 1, the embedding step including embedding into the purchased software data representative of a date that the purchased software is downloaded.

4. The method as set forth in claim 1, the embedding step including embedding into the purchased software data representative of a time that the purchased software is downloaded.

5. The method as set forth in claim 1, wherein the server computer hosts a plurality of different stores that can be accessed by the user computer and from which the purchased software can be requested, the embedding step including embedding into the purchased software data identifying one of the stores from which the purchased software was requested.

6. The method as set forth in claim 1, the purchased software including a marker, the embedding step including the steps of searching the purchased software, locating the marker, and replacing the marker with the embedded information.

7. The method as set forth in claim 1, wherein the method is implemented with a computer program for operating the server computer.

8. A method of operating a server computer that hosts a plurality of stores that may each be accessed by a user computer to download purchased software over a network, the method comprising the steps of:
   encrypting the purchased software;
   storing the purchased software in memory accessible by the server computer;
   receiving at one of the stores a request for the purchased software from the user computer;
   accessing the purchased software with the server computer;
   dynamically embedding information into the purchased software with the server computer after the purchased software has been requested by the user computer; and
   sending the purchased software along with the embedded information from the server computer in portions to the user computer over the network so that the user computer can reassemble a modified version of the purchased software and the embedded information.

9. The method as set forth in claim 8, the embedding step including embedding into the purchased software data representative of a name of a user operating the user computer.

10. The method as set forth in claim 8, the embedding step including embedding into the purchased software data representative of a date that the purchased software is downloaded.

11. The method as set forth in claim 8, the embedding step including embedding into the purchased software data representative of a time that the purchased software is downloaded.

12. The method as set forth in claim 8, wherein the server computer hosts a plurality of different stores that can be accessed by the user computer and from which the purchased software can be requested, the embedding step including embedding into the purchased software data identifying one of the stores from which the purchased software was requested.

13. The method as set forth in claim 8, the purchased software including a marker, the embedding step including the steps of searching the purchased software, locating the marker, and replacing the marker with the embedded information.

14. A computer program stored on a computer-readable memory device for operating a server computer to download purchased software to a user computer over a network, the computer program comprising:
   means for receiving from the user computer a request for the purchased software;
   means for accessing the purchased software;
   means for dynamically embedding information into the purchased software after the purchased software has been requested by the user computer; and
   means for sending the purchased software along with the embedded information in portions to the user computer over the network so that the user computer can reassemble a modified version of the purchased software and the embedded information.

15. The computer program as set forth in claim 14, the embedding means including means for embedding into the purchased software data representative of a name of a user operating the user computer.

16. The computer program as set forth in claim 14, the embedding means including means for embedding into the purchased software data representative of a date that the purchased software is downloaded.

17. The computer program as set forth in claim 14, the embedding means including means for embedding into the purchased software data representative of a time that the purchased software is downloaded.

18. The computer program as set forth in claim 14, wherein the server computer hosts a plurality of different stores that can be accessed by the user computer and from which the purchased software can be requested, the embedding means including means for embedding into the purchased software data representative of the store from which the purchased software is requested.

19. The computer program as set forth in claim 14, the purchased software including a marker, the embedding means including means for searching the purchased software, locating the marker, and replacing the marker with the embedded information.

* * * * *